3,429,857
POLYMERIC COMPOSITION AND PROCESS
OF PREPARING THE SAME
Ralph Earl Layman, Stamford, Conn., assignor to American Cyanamid Company, Stamford, Conn., a corporation of Maine
No Drawing. Filed May 11, 1966, Ser. No. 549,177
U.S. Cl. 260—78.5          10 Claims
Int. Cl. C08f 21/02; C08g 9/30

This invention relates to a process for producing a polymeric coating composition comprising heat reacting maleic anhydride with a mixture of polymethyl ethers of hexamethylol melamine, wherein said methyl ethers are preponderantly pentamethyl ethers and hexamethyl ethers, until an acid number of between about 10 and 90 is reached, thereafter reacting the reaction product thus produced with a polymerizable monomer having a $CH_2=C<$ group and having a boiling point of at least 60° C. until at least about 50% of said polymerizable monomer has been polymerized, wherein said maleic anhydried is used in an amount varying between about 1% and 20%, by weight, based on the total weight of said maleic anhydride and said mixture of melamine compounds and wherein said monomer is used in an amount varying between about 1% and 50%, by weight, based on the total weight of said monomer, maleic anhydride and melamine compounds final reaction product. Still further, this invention relates to a process for producing a polymeric material of the class described in which the maleic anhydride is present in an amount varying between about 5% and 10%, by weight, same basis, and the acid number is controlled between about 20 and 30 and the monomer amount is controlled between about 10% and 20%, by weight, same basis. Still further, this invention relates to the product produced according to the process of the present invention.

One of the objects of the present invention is to produce a polymeric material by a process in which maleic anhydride is heat reacted with a mixture of polymethyl ethers of hexamethylol melamine wherein said methyl ethers are preponderantly pentamethyl ethers and hexamethyl ethers until an acid number of between about 10 and 90 is reached, thereafter reacting the reaction product thus produced with a polymerizable monomer having a $CH_2=C<$ group and having a boiling point of at least 60° C. until at least about 50% of said polymerizable monomer has been polymerized, the amounts of the maleic anhydride as well as the amounts of the polymerizable monomer are controlled within stated limits.

A further object of the present invention is to produce a polymeric material which is useful as a component in a coating composition. These and other objects of the present invention will be discussed in greater detail hereinbelow.

In the practice of the process of the present invention, one starts with two fundamental ingredients, namely, maleic anhydride and a mixture of polymethyl ethers of hexamethylol melamine wherein said methyl ethers are preponderantly pentamethyl ethers and hexamethyl ethers. These methylated methylol melamine compounds are not considered to be resinous materials since they are, as individual entities, pure compounds, but they are potential resin-forming compounds which enter into chemical reaction with the maleic anhydride when subjected to heat. Theoretically, it is possible to methylolate melamine fully, that is, to produce hexamethylol melamine. However, frequently a composition purporting to be hexamethylol melamine, when analyzed, shows what appears to be a fractional or average degree of methylolation. It is well recognized that fractional methylolation is not considered to be possible. As a consequence, when a composition containing on analysis a degree of methylolation of 5.75, 5.80, or even 5.90, or higher, it has to be recognized that this is but an average degree of methylolation of the methylol compound and establishes logically that the aforementioned methylol composition is composed of a mixture of a preponderant amount of hexamethylol melamine with comparatively minor amounts of pentamethylol melamine and perhaps insignificant amounts, including traces, of such derivatives as tetramethylol melamine and even trimethylol melamine. The same concept of averages is also applicable to the alkylation or, more specifically, the methylation of the hexamethylol melamine composition. There cannot be, based on present reasoning, a fractional degree of methylation and, as a consequence, when on analysis a given composition shows that the degree of methylation is 4.85 or 5.15 or 5.25 or even as high as 5.90, or higher, it must be presumed that there exists in the total composition a mixture of hexamethyl ethers of hexamethylol melamines and pentamethyl ethers of hexamethylol melamines and perhaps minor inconsequential amounts of tetramethyl ethers of pentamethylol melamine and hexamethylol melamine and perhaps even trimethyl ethers of these polymethylol melamines. The methyl ethers of the hexamethylol melamine in the starting composition will be preponderantly pentamethyl ethers and hexamethyl ethers. The amount of the maleic anhydride used with the melamine compounds may be varied between about 1% and 20%, by weight, based on the total weight of the reaction products of the maleic anhydride and the melamine compounds. Preferably, one would use between about 5% and 10%, by weight, of the maleic anhydride, same basis. The two components will be introduced into a suitable reaction vessel as will be shown hereinbelow in the stated amounts and the components are heat reacted at temperatures varying between about 80° C. and 100° C. and ranging in time inversely from 10 minutes to about 8 hours. This is in order to accomplish an acid number of about 90 to about 10 and, preferably, 20 to 30, on the reaction product. The exact mechanism of the reaction between these two components is not fully known nor completely understood, but it is speculated that one or more methoxy groups from the methylol melamine compound split off so as to form an ester linkage between one of the carboxyl groups of the maleic anhydride followed by the formation of a methyl ester of the other remaining carboxyl group of the maleic anhydride. It is also speculated that maleic anhydride could react with a free methylol group to form a half ester of maleic anhydride. When the desired acid number is reached, the first step or phase of the reaction has been completed, and it is then time to go on to the second phase of the reaction.

In the second phase of the reaction, the reaction product thus produced is then heat reacted with a polymerizable monomer having a $CH_2C<$ group and having a boiling point of at least 60° C. until at least about 50%, by weight, of said polymerizable monomer has been polymerized.

Among the polymerizable monomers which may be used in the process oft he present invention are the polymerizable styrenes such as styrene per se and the ring-substituted alkyl and halo styrenes such as the ortho, meta, and paramethyl styrenes, the ortho, meta, and paraethyl styrenes, the ortho, meta, and parachloro styrenes, the ortho, meta, and parabromo styrenes, the ortho, meta, and paraiodo styrenes, the ortho, meta, and parafluoro styrenes, and the like. Disubstituted ring styrenes may also be used such as the 2,4-dimethyl styrene, the 2,5-diethyl styrene and the 3,4-dipropyl styrene, and the like. Still further, one may make use of the polymerizable nitriles such as acrylonitrile, methacrylonitrile, ethacrylonitrile, and the like. Still further, one may make use of the alkyl esters of the acrylic acids such as methyl acrylate, ethyl acrylate, propyl acrylate, butyl acrylate, methyl methacrylate, ethyl methacrylate, propyl methacrylate, butyl methacrylate, and the like. Still further, one may make use of the polymerizable α,β-ethylenically unsaturated mono carboxylic acids such as acrylic acid, methacrylic acid, ethacrylic acid, crotonic acid, and the like. Still further, one may make use of the polymerizable amides such as acrylamide, methacrylamide, ethacrylamide, and the like. These polymerizable monomers are used in amounts varying between about 1% and about 50%, by weight, based on the total weight of the final reaction product, namely, the total weight of the reaction product of said polymerizable monomer, maleic anhydride, and melamine compounds. Preferably, one would use between about 10%, by weight, and 20%, by weight, same basis.

During the second step of the process of the present invention, namely during the reaction of the polymerizable monomer with the maleic anhydride-melamine compound reaction product, the polymerization is carried out at a temperature between about 60° C. and 90° C. for a period varying inversely between about 4 and 24 hours. Preferably, one would react for about 6–8 hours. Although it is not necessary to make use of a polymerization catalyst during the second step of the reaction, better results are achieved by making use of a free radical catalyst such as benzoyl peroxide, tertiary butyl hydroperoxide, cumyl hydroperoxide, and the like. These catalytic materials may be present in amounts varying between about 0.1% and 2%, by weight, based on the total weight of all of the reactants. Although the reactants in the second step can be reacted in neat form, that is, in bulk, it is preferable, however, to make use of an inert organic aromatic solvent such as benzene, xylene, toluene, and the like, or esters, ketones, and the like, may be used in order to avoid the exotherm which may develop if the reaction in the second phase is carried out in bulk. The presence of the diluting solvent tends to diminish the tendency toward the development of an exotherm. In carrying out the second step of the reaction, the heating is continued until at least 50% of the polymerizable monomer has been copolymerized with the maleic melamine compound reaction product.

In order that the concept of the present invention may be more fully and completely understood, the following examples are set forth in which all parts are parts, by weight, unless otherwise indicated. These examples are set forth primarily for the purpose of illustration and any specific enumeration of detail contained therein should not be interpreted as a limitation on the case except as is indicated by the appended claims.

Example 1

Into a suitable reaction vessel equipped with thermometer, stirrer and reflux condenser, there is introduced 117 parts of hexamethyl ether of hexamethylol melamine and 23.3 parts of maleic anhydride. The charge is heated to 100° C. and held at that temperature for about 12 hours until an acid number of 33.5 is reached. The resulting product has a viscosity on the Gardner-Holdt scale at 25° C. of $Z_4$. Twenty-one parts of the adduct thus prepared are then introduced into a separate reaction vessel along with 9 parts of xylene, 2 parts of monomeric styrene and 0.2 part of benzoyl peroxide. The reactants are blended together in the suitable reaction vessel and the air in the vessel is flushed away by use of nitrogen gas. The charge is heated with constant stirring for 16 hours at 75° C. to yield a clear solution having a viscosity on the Gardner-Holdt scale of Y.

Example 2

Into a suitable reaction vessel equipped as in Example 1, there is introduced 600 parts of a mixture of polymethyl ethers of polymethylol melamine wherein the average degree of methylolation is about 5.80 and the average degree of methylation is between about 4.85 and 5.15, 31 parts of maleic anhydride and 1 part of pyridine. The reactants are heated together in the reaction vessel to 85° C. in about two hours. The charge is then cooled to 45° C. and has an acid number of 32 and a viscosity on the Gardner-Holdt scale of $Z_2$–$Z_3$. The adduct thus prepared in an amount of 52.5 parts is introduced into a suitable reaction vessel along with 17.5 parts of styrene, 0.53 part of benzoyl peroxide, 17 parts of toluene and 30 parts of methyl ethyl ketone. The charge is mixed together thoroughly and the reaction vessel is flushed with nitrogen gas in order to remove the air from the system. The charge is heated for sixteen hours at 71° C. to give a clear solution.

Example 3

Example 2 is repeated in all essential details except that 72 parts of the adduct prepared according to Example 2 are blended with 8 parts of styrene and 1 part of benzoyl peroxide and following the procedure of Example 2, a clear polymeric solution is produced having a Gardner-Holdt viscosity of $Z_2$ at 25° C. measured on an 80% solids solution in xylol.

Example 4

Example 2 is repeated in all essential details with the following exceptions: 620 parts of the adduct prepared according to Example 2 are charged to a suitable reaction vessel equipped with stirrer, thermometer and reflux condenser. The air is flushed out of the reaction vessel by the use of nitrogen gas. Heat is applied and at 50° C., 69 parts of styrene and 6.9 parts of benzoyl peroxide are added. The solution is then heated up to about 85° C. in one hour and held at 85–88° C. for about 5½ hours whereupon the reaction mass is cooled to about 75° C. 173 parts of xylol are stirred in and the solution is cooled to room temperature. The polymeric solution has a viscosity on the Gardner-Holdt scale of $Z_5$ at 25° C.

Example 5

387 parts of the adduct prepared according to Example 2 are blended with 127 parts of xylene, 49 parts of monomeric styrene, 49 parts of monomeric methyl methacrylate and 4.8 parts of benzoyl peroxide. After the above materials were charged to the suitable reaction vessel as in Example 4, the charge was treated as in Example 4 and when cooled and cut to 70% solids with additional xylene, the viscosity was about $Z_4$–$Z_5$ on the Gardner-Holdt scale at 25° C.

Example 6

Example 5 is repeated in all essential details except that in the place of styrene there is substituted an equivalent amount of vinyl toluene and in the place of the benzoyl peroxide there is utilized an equivalent amount of tertiary butyl peroctoate. The final viscosity of the solution was $Z_3$ on the Gardner-Holdt scale at 25° C.

Example 7

Into a suitable reaction vessel equipped as in the preceding examples, there is introduced 40 parts of the adduct prepared according to Example 2, 20 parts of vinyl toluene, 20 parts of methyl methacrylate, 0.8 part of benzoyl peroxide and 40 parts of xylol. These components are blended together thoroughly and the air in the vessel is then displaced by gaseous nitrogen. The charge is then heated for 16 hours at 70° C. and the ultimate product is a clear, very heavy resin having a Gardner-Holdt viscosity somewhat greater than about $Z_6$.

Example 8

Into a suitable reaction vessel equipped as in Example 1, there is introduced 1200 parts of hexamethyl ether of hexamethylol melamine composition and 60 parts of maleic anhydride. The charge is heated at 90–100° C. under a nitrogen blanket for about 8 hours at which time the acid number was about 9.5. This adduct is then copolymerized with 11% of its weight of styrene and 1% of benzoyl peroxide for 16 hours at about 75° C. A resin solution is produced which has a viscosity of Y at 80% solids in xylol.

Example 9

Into a suitable reaction vessel equipped as in Example 1, there is introduced 140 parts of hexamethyl ether of hexamethylol melamine composition and 23 parts of maleic anhydride. The charge is heated under a blanket of nitrogen gas to 90–95° C. and held at that temperature for about 10 minutes whereupon it is then cooled down to about 30° C. The acid number was about 89 and the viscosity on the Gardner-Holdt scale was about Y–Z at 25° C. 76 parts of the adduct thus prepared are blended with 4 parts of styrene, 0.5 part of tertiary butyl peroctoate and 20 parts of xylene. The charge is heated at about 70° C. for about 16 hours. The product produced had a viscosity of W on the Gardner-Holdt scale and the conversion of the monomeric styrene to polymeric styrene was over 90%.

The resinous compositions in the Examples 1–9, inclusive, are particularly useful for making a coating composition by blending said resinous materials with an alkyd coating resin of the non-air-drying type. A conventional alkyd resin to be used for this purpose can be prepared by reacting according to the following procedure.

Alkyd resin A

Into a suitable reaction vessel equipped with thermometer, stirrer and reflux condenser, there is introduced 145 parts of phthalic anhydride, 3 parts of fumaric acid, 112 parts of coconut oil fatty acids, and 102 parts of glycerine. The charge is heated at about 215° C. until an acid number of about 8–10 is reached. Thereupon, the resulting alkyd resin is cut with xylol to produce a 60% solids solution. 10 parts of each of the resin solutions of Examples 1–9, inclusive, are blended with 30 parts of alkyd resin A solution in order to produce a coating material for use on paper. There is added to each of the nine blends 1 part of a 20% solution of paratoluene sulfonic acid in isopropanol. The paratoluene sulfonic acid is used as a catalyst in order to promote cross-linking between the components of Examples 1–9, inclusive, and the alkyd resin A, respectively.

An additional 5 parts of isopropanol is added in order to thin the coating composition to a lower viscosity. Even more solvent can be added for the purpose of reducing the viscosity if for a particular purpose such lower viscosity coating composition is desired. The coating compositions thus prepared were applied to paper and when baked for 10 minutes at 200° F., a smooth, tack-free, glossy, adherent, hard film was obtained. Alternatively, if desired, the applied coating could have been baked for one minute at 300–400° F. The coatings of the present invention can be applied to other substrates such as wood, metal, plastic sheet, and the like.

Example 10

A coating composition having excellent color and gloss is prepared by blending 50 parts of the resin of Example 3 (a 75% solids solution in xylol) with 5 parts of castor oil, 0.5 part of paratoluene sulfonic acid, 5 parts of isopropanol and 5 parts of toluene. When the blend is thoroughly mixed so as to form a substantially homogeneous mix, it is then knifed onto sized paper so as to deposit a ½ mil thick wet film and baked for ½ minute at 300° F. A clear, hard, flexible coating is obtained.

I claim:
1. A process for producing a polymeric material comprising heat reacting maleic anhydride with a mixture of polymethyl ethers of hexamethylol melamine, wherein said methyl ethers are preponderantly pentamethyl ethers and hexamethyl ethers, until an acid number of between about 10 and 90 is reached, thereafter reacting the reaction product thus produced with a polymerizable monomer having a $CH_2=C<$ group and a boiling point of at least 60° C. until at least 50% of said polymerizable monomer has been polymerized, wherein said maleic anhydride is used in an amount varying between about 1% and 20%, by weight, based on the total weight of said maleic anhydride and said mixture of melamine compounds and wherein said monomer is used in an amount varying between about 1% and 50%, by weight, based on the total weight of the monomer, maleic anhydride and melamine compounds final reaction product.

2. The process according to claim 1 in which the amount of maleic anhydride is between about 5% and 10%, by weight, the acid number is controlled between about 20 and 30, and the amount of monomer is between about 10% and 20%, by weight.

3. The process according to claim 1 in which the polymerizable monomer is a polymerizable styrene.

4. The process according to claim 2 in which the polymerizable monomer is a polymerizable styrene.

5. The process according to claim 1 in which the polymerizable monomer is an alkyl ester of an acrylic acid.

6. The process according to claim 4 in which the polymerizable styrene is styrene per se.

7. The process according to claim 4 in which the polymerizable styrene is vinyl toluene.

8. The process according to claim 2 in which the polymerizable monomer is an alkyl ester of an acrylic acid.

9. The process according to claim 8 in which the alkyl ester is methyl methacrylate.

10. The product produced according to the process of claim 1.

References Cited

UNITED STATES PATENTS 2,906,724   9/1959   Daniel.
3,381,054   4/1968   Le Blanc.

JOSEPH L. SCHOFER, *Primary Examiner.*

JOHN KIGHT, *Assistant Examiner.*